(No Model.)
J. B. MILLER.
THILL SUPPORT FOR VEHICLES.
No. 550,994. Patented Dec. 10, 1895.
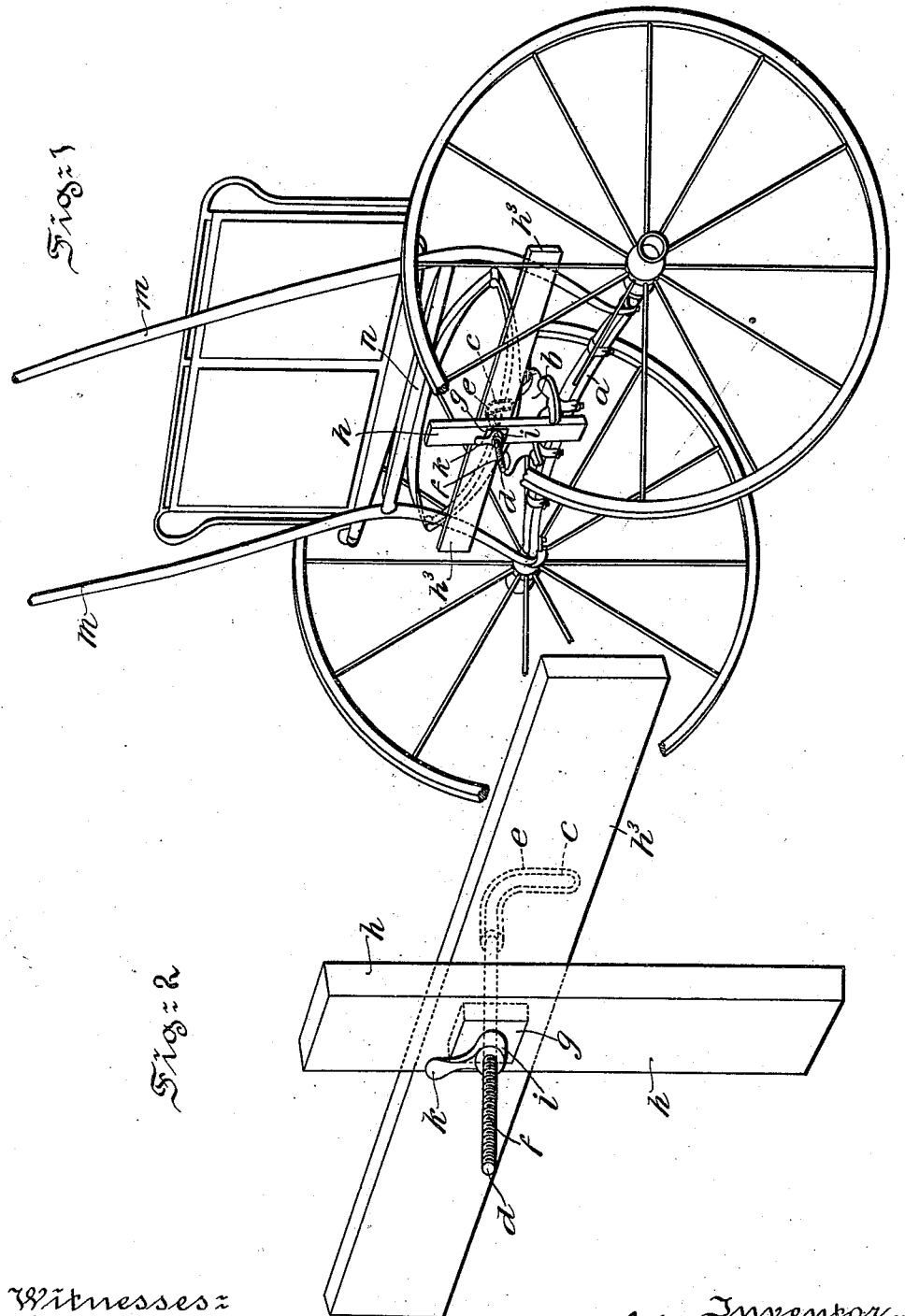
Witnesses:
Thomas M. Smith.
Richard C. Maxwell.
Inventor
J. Blackburn Miller,
By J. Walter Douglass
Attorney.

UNITED STATES PATENT OFFICE.

JOHN BLACKBURN MILLER, OF NEWBURG, NEW YORK.

THILL-SUPPORT FOR VEHICLES.

SPECIFICATION forming part of Letters Patent No. 550,994, dated December 10, 1895.

Application filed August 2, 1895. Serial No. 557,948. (No model.)

*To all whom it may concern:*

Be it known that I, JOHN BLACKBURN MILLER, a citizen of the United States, residing at Newburg, in the county of Orange and State of New York, have invented certain new and useful Improvements in Thill-Supports for Vehicles, of which the following is a specification.

My invention has relation to a thill-support for vehicles, and in such connection it relates more particularly to the general construction and arrangement of such a support.

The principal objects of my invention are, first, to provide an efficient, durable, and comparatively inexpensive thill device for a vehicle adapted to meet the requirements and perform the functions of a support, and, second, to provide a thill-support having a hook-shaped bolt adapted to removably engage the head-block of the front axle of a vehicle, and a prop adjustable on said bolt and adapted to be locked thereto, said prop adapted to support the thills or shafts at two points.

My invention consists of a thill-support for a vehicle constructed and arranged as hereinafter described and claimed.

The nature, characteristic features, and scope of my invention will be more fully understood from the following description, taken in connection with the accompanying drawings, forming part hereof, in which—

Figure 1 is a perspective view of the front of a vehicle, showing my thill-support in operative position and illustrating the prop adapted to support the thills at two points by resting against both thills; and Fig. 2 is a similar view of my thill-support detached from the vehicle.

Referring to the drawings, $a$ represents the axle, and $b$ the head-block, of a vehicle. Over the head-block $b$ is adapted to be placed the hook-shaped end $c$ of a threaded bolt $d$. The hook end $c$ of the bolt $d$ is surrounded by a sleeve $e$, of rubber, leather, or the like, in order that the hook $c$, when the support is in operative position, will not abrade or disfigure the bearing-surface of the head-block $b$, with which it is brought into engagement. The other end of the bolt $d$ is screw-threaded, as at $f$, and is adapted to screw into a nut $g$, secured preferably into the body of a prop or arm $h$, of wood or other material. This prop or arm $h$ may be advanced toward the hook-shaped end $c$ or retracted therefrom by screwing or unscrewing the arm through its nut $g$ on the threaded portion $f$ of the bolt $d$. The arm $h$ is confined with regard to its position on the bolt $d$ by means of a sleeve $i$, threaded on its interior and adapted to be screwed on the threaded portion $f$ of the bolt $d$ until it rests against the nut $g$ and jams the same against the threads of the bolt $d$. An arm or handle $k$ is secured to the sleeve $i$, so that the same may readily be advanced or retracted on the threaded portion $f$ of the bolt $d$. The prop $h$ carries a horizontal bar $h^3$, the ends of which rest under the thill $m$, as illustrated in Fig. 1. The thills are supported by the arms $h^3$, while the lower end of the prop $h$ rests against the axle $a$.

In operation the hook $c$ is placed over the top of the head-block $b$ after the thills or shafts $m$ are raised, and the prop $h$ is advanced on the bolt $d$ until its lower end rests against the axle $a$. The ends of the horizontal bar $h^3$ then rest under the thills or shafts $m$. The prop is then locked in this position by turning the sleeve $i$ by means of its handle $k$ until the sleeve jams against the nut $g$ in the prop $h$ and binds the same on its bolt $d$.

Having thus described the nature and objects of my invention, what I claim as new, and desire to secure by Letters Patent, is—

In a thill support, a bolt having a threaded portion and provided at one end with a hook embraced by a removable rubber sleeve adapted to fit over the head block of the vehicle, a prop, a nut adapted to be advanced on the threaded portion of said bolt, a sleeve threaded to the bolt and provided with a handle to jam the nut on said bolt so as to lock said prop thereto, and a cross-arm carried by the prop, the ends of which extend under and support said thills or shaft while in an elevated position, substantially as described.

In testimony whereof I have hereunto set my signature in the presence of two subscribing witnesses.

J. BLACKBURN MILLER.

Witnesses:
BENJ. MCCLUNG,
J. WALTER DOUGLASS.